United States Patent [19]

Jonsson

[11] Patent Number: 4,945,671
[45] Date of Patent: Aug. 7, 1990

[54] SNAP LOCK FOR HOOK-SNOOD ON A LINE FOR LONG-LINE FISHING TO CHANGE AUTOMATICALLY BROKEN SNOODS

[76] Inventor: Sigurbjorn A. Jonsson, P.O. Box 8947, 108 Reykjavik, Iceland

[21] Appl. No.: 401,118

[22] Filed: Aug. 31, 1989

[30] Foreign Application Priority Data

Sep. 6, 1988 [IS] Iceland .................................. 3388

[51] Int. Cl.⁵ ............................................ A01K 91/04
[52] U.S. Cl. ...................................... 43/44.94; 43/57.3
[58] Field of Search ...................... 43/44.84, 57.3, 27.4

[56] References Cited

U.S. PATENT DOCUMENTS

| | | | |
|---|---|---|---|
| 3,533,184 | 10/1970 | Kerr | 43/44.84 |
| 4,630,388 | 12/1986 | Furlong | 43/57.3 |
| 4,829,696 | 5/1989 | Sorensen | 43/44.84 |

FOREIGN PATENT DOCUMENTS

| | | | |
|---|---|---|---|
| 634286 | 3/1950 | United Kingdom | 43/44.84 |
| 1370710 | 7/1964 | France | 43/44.84 |

OTHER PUBLICATIONS

World Fishing, vol. 18, No. 5, May 1969, p. 45, 5-1969, Design for Mechanical Longline Handling.

Primary Examiner—M. Jordan
Attorney, Agent, or Firm—Richard C. Litman

[57] ABSTRACT

The invention is about fastening a hook snood 6 with an endless line 1 and includes a mechanical automatic changing of broken hook snoods 6 when long-line fishing, a so called addendum apparatus.

The fastening 4,14 is made as an oblong tube 4 of pliant material open to be able to grasp around the line 1, but able to close with a snap lock 11,12,13 a kind of a snap 4, which is clapped on the line 1 and locked with a hitch lock 9,11,12,13. The tube 4 can turn around the line 1. Underneath it there is a cylinder 14 fastened to the line 1, on its ends are fixed hindrances 3 which prevent movement on the line 1. On the tube 4 is a hold 5 for the snood 6. Within the hole 5 on the end of the snood 6 is a proturberance, knob 8, bigger than the hole 5 and corresponding space, knob house 7 and a seat for the knob, knob seat 18. The snood 6 can rotate in the hole 5 and thus develops a swivel, but the knob 8 prevents that the snood 6 is pulled through the hole 5.

The cylinder 14 is fastened, e.g., fused to the line 1. The tube 4 is molded from a suitable flexible material, e.g., plastic, and is able to be clipped or cut (FIGS. 6,7) off the line 1 with rotary knives 16 in a single movement canal, steering 21, when snood 6 is changed. New tube 4 with snood 6 is then snapped around the cylinder 14. That is done with a power-driven apparatus, addendum apparatus 33,36, which moves the tube 4 to the cylinder 14 and thrusts it together and locks the snap lock 11,12,13. The tube 4 thereby locks around the cylinder 14.

12 Claims, 2 Drawing Sheets

4,945,671

SNAP LOCK FOR HOOK-SNOOD ON A LINE FOR LONG-LINE FISHING TO CHANGE AUTOMATICALLY BROKEN SNOODS

BACKGROUND OF THE INVENTION

FASTENED SNOOD AND TUBE FASTENING

Formerly snoods were tied to the line and then the line twisted the snoods around itself when stretched because the line is a coiled cord. When baited it was necessary to wind each snood off the line and that detained the baiting, which was done by hand. These are fastened snoods. This was improved by an unengaged tube or a ring which the line could turn around in. On both sides of the tube fixed hindrances were put on the line to prevent its movement on the line. This is a tube fastening. The tube was made of rigid steel and bent around the line and durable, but still open. On the tube was a hole and in it a bent nail or a crook with a head (a swivel really) which held the crook in the hole. The snood had a loop, which was slipped on the crook. That way the snood was changed by hooking the loop off the crook and a new snood was hooked on. This has to be done by hand. This includes a durable tube with a hole and in the hole is a swivel with a crook, but a snood with a loop which can be changed and hooks on the durable crook. A durable hook With a hole, a swivel and a hook is not suitable for mechanical changing of the snood. That way it was not possible to change the snood by cutting the tube off and putting on a new one. Neither was it possible by cutting the crook off and changing the crook. The fundamental concept of the invention is to change the snood by changing the tube.

It is also known to put an ordinary swivel between hindrances on the line with a closed eye instead of a tube. The swivel is a closed tube fastener rotatable around the line and the snood rotates in the middle of the swivel. The shortcoming of this swivel is that it is fastened on the line. It is a fastened, locked tube fastening and the swivel must be thread on the line from the end and the snood must be tied to the swivel. These two points, threading from the end and tying the snood, prevent mechanization. The mechanization of the onput of snoods demands an open fastening, which can turn around the line, and the fastening is the foundation for mechanization. With the accession of stronger snoods in Nylon, which are hard to see in water, and supposed to increase the catch, perplexity increased because Nylon is a stiff thread which is hard to tie.

The need for an open knot-free fastener demanded a solution in order to make it possible to mechanize the onput and the changing of broken snoods. The open fastener includes a firm cylinder and an open tube, knot-free attachable to the snood. This is the subject of the invention.

KNOWN HINDRANCES

Familiar are hindrances joined to the line made as rings, clipped on or with cogs, which go into the line. There also is a method known (according to Norwegian Application No. 830,571 since 1983) to sew on the line with a machine and that way form a thickness on the line. It is also known to tie a knot on the line and found a knob around the knot to develop a hindrance (according to Norwegian Application No. 770,933 from 1977). These hindrances do not mark out any fixed place for the tube but mark a determined space, and are therefore an unsafe foundation for mechanization of the onput of snoods, which demands a fixed location on the line. Fixed cylinders exist which are clipped on or flanged from steel but they are expensive and inconvenient because of the rigidity of the steel if mechanization involves cutting the loose tubes off when the snood is changed.

LAST YEARS DEVELOPMENT

With mechanization of long-line fishing the onput of snoods has been the most difficult and has been done manually although, for example, the baiting and storage of the line has been mechanized. The evolution has also aimed at the mechanization of the onput of snoods, including removing all the hooks and snoods off the line for storage and then storing the line without hooks to ease the management of it and prevent that hooks get caught and tangle the line. A corresponding device includes disengaging and is capable of being applied to mechanized onput of snoods, where only broken snoods are renewed.

MECHANIZATION OF CHANGING THE SNOODS WITH HOOKS

Familiar is locked tube threaded on the line with a hole in the direction of the line for a crook where the snood is tied on in the usual manner (according to Norwegian Patent Description No. 84,186 from 1984). The crook is hooked from the hole, when the snood is taken off the line and hooked in the hole, when it is put on it. The crook has an attached oblong stub, which glides in a steering canal by an orbit rectangular to the line, where the hole on the tube moves up on the hook and takes with it the snood when the line passes the track. The present invention does not include a locked tube, not a hole in the direction of the line and not a crook on the snood.

An open tube of steel is known on the market. The tube is bent around a cylinder on the line and so rigid that it does not open with force but is still open and is not locked and is durable. It is not possible to open or chop it from the line and can therefore not be used to change the snood by changing the tube. On the tube there is a hemispherical front with an oblong canal and in it lies an end of a hook with a protuberance on the end. On the end of the snood there is a loop which is slipped on the crook by hand. The fastening is unsuitable for mechanized use because of those reasons. The tube is open and not locked, and its strength is based on the rigidity of the steel. Because of the shape and the rigidity it is impossible to use it as a changeable tube. The tube is not locked and therefore subject to flexing moment with the pulling force on the snood and must therefore be made of steel, a rigid material, which is not possible to cut with knives. This tube is not locked with a lock.

An open T-shaped locked tube made from steel around the cylinder is known (according to Norwegian Patent No. 138,976 from 1980), where the tube is locked with knobs on each side of the joining of the tube. There are knobs on each side of the tube. The sides are laid together, and over the knobs a locking link or a flexible ring and the snood is tied on the link or the ring in an ordinary manner. In that way the snood cannot turn on its axis in the fastening and is therefore not a swivel for the snood. On the sides are knobs, which lock the link to the knobs. It is presumed that each snood is taken off the line, when it is hauled, to ease management and storage.

Included with this locked tube of steel is an automatic apparatus to disengage snoods (according to Norwegian Patent Description No. 142,601 and a patent from 1980) and another apparatus to put such snoods on a line (according to Patent Description No. 146,118 and a patent from 1982). According to this patent an open tube is known which can be put around an endless line and locked. Thus with force it only develops a tow on the part of it which lies at the line. On the other hand, the knob axis is subject to both flexing force and pulling and the knobs (4) must support a cutting power multiple the towing force of the snood. Because of these reasons, the whole tube must be made of steel and will therefore never be a changeable tube. The present invention includes an open tube with a lock but not with knobs or a locking link.

SUMMARY OF THE INVENTION

A fastening for a snood on an endless line including a cylinder fastened on the line and an open tube which is locked with a lock around the cylinder, exists. The lock is a knob lock made of steel with knobs of steel and a springy link and is different from the lock according to the invention. It is made to change a snood by changing the link but not the tube. The snood is tied to the link in the usual manner.

Figure 1:
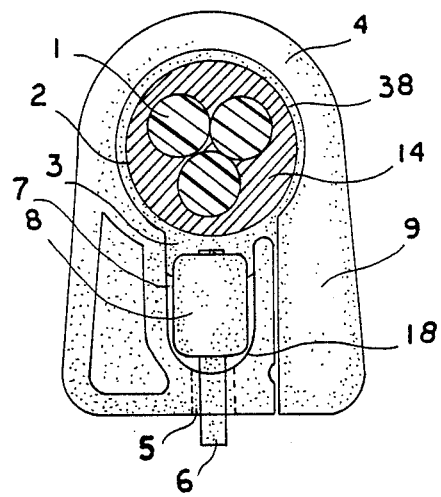
FIG. 1 shows the tube 4, in other words a snap 4 in the direction of the line and a cross section in the underlying cylinder 14 and line 1. On the line 1 is cylinder 14 with drum 2 and hindrances 3. Around the cylinder 14 is a tube 4 with a snap lock with side 9, the so-called snap 4. On the snap lock 4 is a hole 5 for the snood 6 with a protuberance, knob 8 on a knob seat 18 in a knob house 7, which is open into the line house 38.
Figure 2:
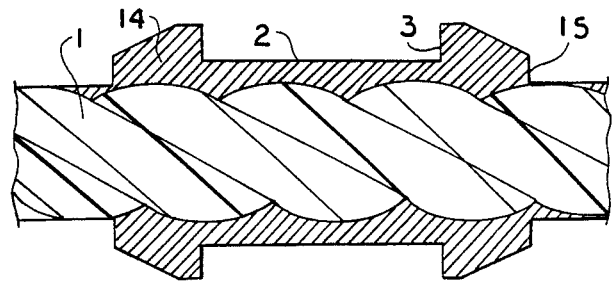
FIG. 2 shows the longitudinal section of cylinder 14 which is molded, e.g., fused on the line 1. A drum 2 with hindrances 3 makes a seat for a snap 4. The end surface 15 of the cylinder 14 activates a switch.
Figure 3:
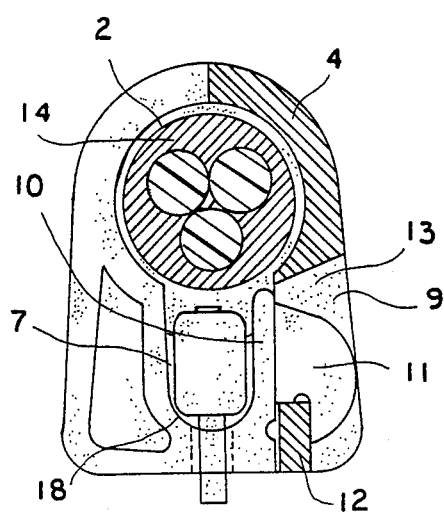
FIG. 3 shows snap lock 4 from the side in the direction of the line 1, where the right part of the snap lock is cut open to show the hitch lock 9,11,12,13. On one side of (10) of the knob house 7 is a hitch 11, which goes through a hole 13 on the other end of a tube 4 and hooks on a lock bar 12, which with the sides 9 are attached to the other part of the tube 4. This part makes an open tube into a closed one.
Figure 4:
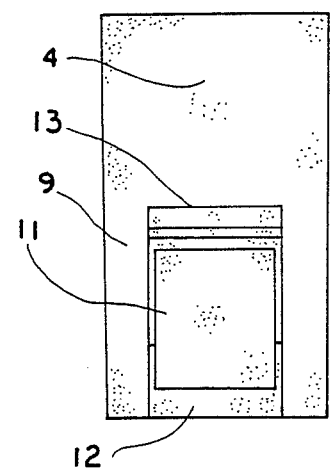
FIG. 4 shows snap lock 4 on FIG. 3 in the direction rectangular to the line 1.
Figure 5:
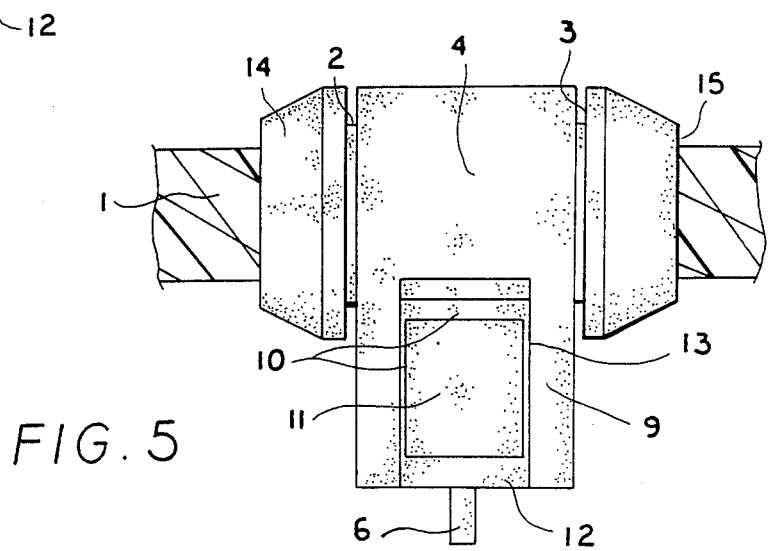
FIG. 5 shows in whole the fastening of the snood 6 to the line 1 seen rectangular to the line 1 with the same representation as FIGS. 1–4.
Figure 6:
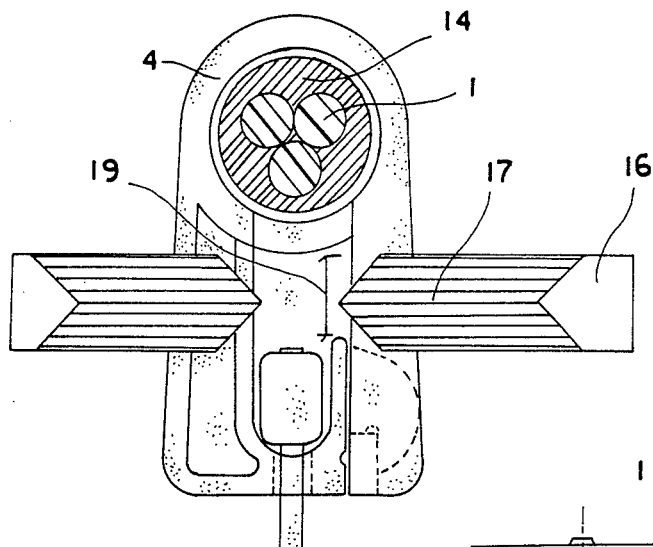
FIG. 6 shows the cutting position 17 of the knives 16, when the snap lock 4 on the cylinder 14 pulls past them and a part which adjusts to the thickness 19 of the knives is cut from snap lock 4, which therewith is cut off and disconnects from line 1 and cylinder 14.
Figure 7:
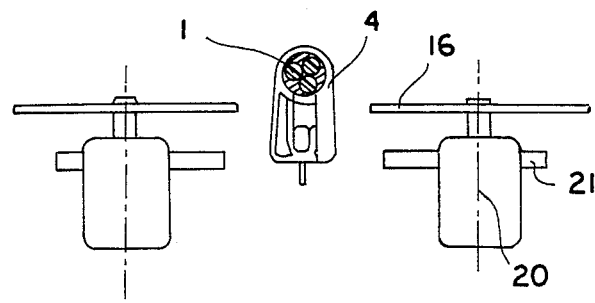
FIG. 7 shows the knives 16 and their position, when not in cutting position, to snap lock 4 which is to be cut, along with the tracks 21, where the knives 16 move along into the cutting position 17 and the knife motors 20.

Hooks 24 with arc 25, point 26 and hook knob 27 according to a special prior invention are ranged together with the same intervals as snap locks 4 With point 26 fastening to string 28, which covers or protects points 26. Snoods 6 are likewise ranged on snood string 23. Snoods 6 have protuberances on its ends, knobs 8, which go into the holes 5. Therewith it is a strip of snap lock snoods according to FIG. 8 ready to be attached on line 1 with addendum apparatus according to FIG. 9. The strip can be wound up in a roll.

Figure 8:
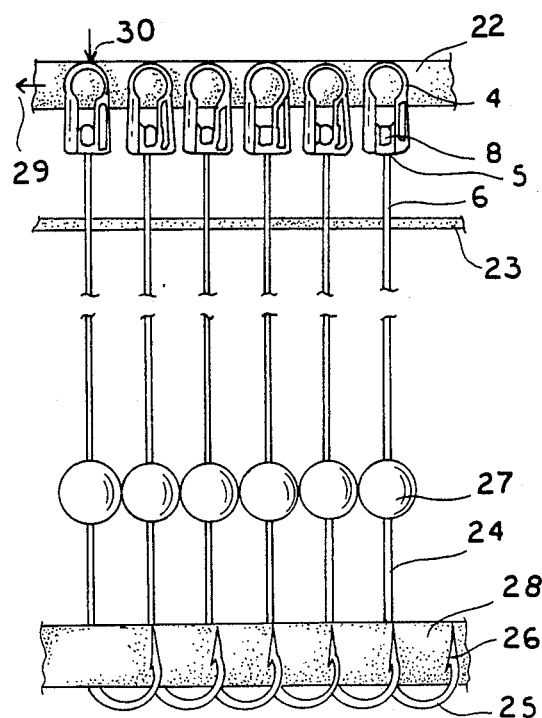
FIG. 8 shows the snap locks 4 in a row on a string or a ribbon, a snap lock string 22, with attached snoods 6 on a snood string 23 and hooks 24,25,26,27 on a hook string 28. Snap locks 4 are molded open and ranged or fastened on a string or a ribbon, a snap lock string 22.
Figure 9:
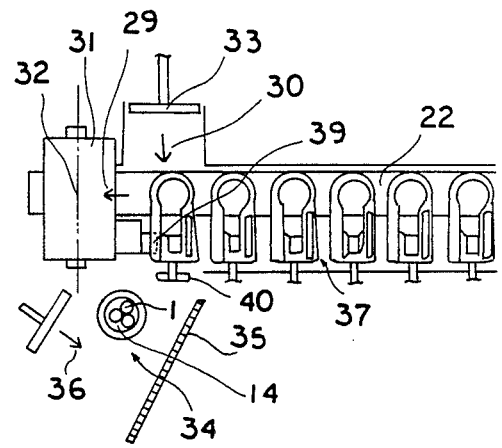

FIG. 9 shows the addendum apparatus 31,32,33,34,35,36,37 in the direction of the line 1. The snap lock string 22 with attached snaps 4 with the attached snoods 6 and hooks 24 according to FIG. 8 are pulled in direction 29 of the roller 31 which turns around the axis 32 by a canal 37 which is open underneath for the snoods 6. When the first snap lock is about to come to the bolt 33, it touches a knob 39, which stops the movement when a cylinder controller has studied a cylinder 14 which has no accompanying snap lock, the bolt 33 presses the snap lock 4 in the direction 30 of the addendum apparatus house 34 by steering (35) it to the cylinder 14 and onto the cylinder, and the lock bolt 36 closes the lock 11,12. The snap lock strip 22 is then pulled to next snap lock 4.

FIG. 9 shows the snap lock 4 locked. Thereby they take less space. Locked snap locks open by thrust in the direction of the snood 6 because they are molded open. With a movement over a springy hindrance 40, the snap lock 4 opens. The addendum apparatus is of course suitable to arrange a long-line and for the onput of new snoods on a new and unused line with cylinders on. An illustration of the invention Will now be described in more detail with enclosed drawings.

A DETAILED DESCRIPTION OF THE INVENTION

According to the invention the tube 4 is open and is therefore capable of being put on an endless line and is locked with a hitch lock or a snap lock 9,11,12,13. After it is locked the tube 4 is closed and locked. In that manner, when the snood 6 is pulled in the direction rectangular to the line 1, there develops a tow only in the tube, but not bending moment as in an open and bent rigid tube. Because of this, the tube 4 can be made of weak and soft material, e.g., plastic, can be molded, is cheap and can be thrown away. This is a necessary condition to be able to change the tube 4 to change a broken snood 6.

On the tube 4 is a hold 5 which the snood 6 goes into and the snood 6 has a protuberance, a knob 8, which acts as a swivel. The tube 4 is made of plastic and can be taken off the line 1, e.g., by clipping, cutting or chopping the tube 4 off if a snood 6 has broken or a hook 24,25 is damaged.

Under the tube 4 is a cylinder 14 made of plastic fastened, e.g., fused around the line 1 without bruising it or damaging it with pressure. The edges or the collars 3 of the cylinder go to the extreme edge of the cylinder 14 and protect it from damage. The tube 4 is open is open out to a seat 18 on the knob 8 on the end of the snood 6. Thus can the knob 8 go into the seat 18 from the middle of the tube 4 and the seat 18 with the hole 5 for the snood 6 is therefore part of the tube 4. On one side of the seat 18 is a hitch 11 of the snap lock 9,11,12,13, and on an adjacent part of the other arm of the tube 4 is a corresponding locking part 12 with sides 9 and a hole 13 for the hitch 11. An experimental copy with outer diameter 11 mm and the length of the tube 10 mm broke down at 93 kg.

I claim:

1. Apparatus for fastening a snood to a fishing line, including:

a snap lock clip having a line gripping portion and a snood gripping portion, said line gripping portion having a central axial aperture formed by two resilient interengaging arms that releasably lock together, said snood gripping portion having a cavity and a cavity aperture in which a snood end is disposed;

a snood having a hook end and an oppositely disposed attachment end, said attachment end having a knob disposed thereon, said knob is disposed in said cavity with said knob having a greater width than said cavity aperture and said snood disposed through said cavity aperture thereby holding said snood in swiveling relationship on said snap lock clip.

2. The apparatus for fastening a snood to a fishing line according to claim 1, including:

an elongated bobbin tube having a central axial passageway adapted for receiving a fishing line therethrough;

perpendicular shoulders disposed on opposite ends of said elongated tube creating a recess on the outer surface of said elongated tube, said central axial aperture being removably disposed around said elongated tube in said recess.

3. The apparatus for fastening a snood to a fishing line according to claim 1, wherein:

said cavity aperture is perpendicularly disposed in relation to said fishing line.

4. The apparatus for fastening a snood to a fishing line according to claim 2, wherein:

said snap lock clip is disposed in said recess perpendicular to said line and elongated tube.

5. The apparatus for fastening a snood to a fishing line according to claim 1, wherein:

one of said interengaging arms includes the snood gripping portion of said snap lock clip;

a locking mechanism for locking together said interengaging arms is disposed adjacent said cavity and beneath said central axial aperture.

6. The apparatus for fastening a snood to a fishing line according to claim 5 wherein:

said locking mechanism is of the resilient snap lock variety.

7. The apparatus for fastening a snood to a fishing line according to claim 5 including:

a gap disposed above and between said knob and said central axial aperture allowing cutting devices to pass through said gap and over said knob to cut severe said snap lock clip without damaging said snood.

8. A method of fastening snoods to a fishing line including the following steps:

attaching a plurality of individual snoods to individual releasably locking clips to form a plurality of snood assemblies, said snoods having an end knob mounted in a cavity on said locking clip thereby allowing said snood to swivel in relation to said locking clip;

arranging and attaching said snood assemblies in continuous adjacent fashion on a first strip with said locking clips disposed on said first strip and said snoods hanging perpendicularly below said first strip;

disposing a fishing line having bobbins disposed thereon perpendicular to and below said first strip;

running said fishing line in a continuous fashion past said first strip and snood assemblies;

searching for a bobbin and locking clip on said fishing line as said bobbin passes by said first strip;

determining if a hook and snood are attached to said locking clip;

removing said locking clip that has no hook from said bobbin and removing one said snood assembly from said first strip and placing said locking clip of said snood assembly about said bobbin;

repeating said steps of searching, determining, removing and placing until all of said fishing line has run past.

9. The method of fastening snoods to a fishing line according to claim 8 including:

running said first strip and attached snood assemblies in a step by step fashion after each snood assembly is removed and placed on said bobbin.

10. The method of fastening snoods to a fishing line according to claim 8 including:

attaching hook portions of said snoods to a second strip disposed beneath said first strip and running said second strip in conjunction with said first strip.

11. The method of fastening snoods to a fishing line according to claim 10 including:

mounting said first and second strips to pulling rollers such that said first and second strips go past said rollers in a step by step fashion.

12. The method of fastening snoods to a fishing line according to claim 8 wherein:

said step of removing said locking clip from said bobbin is accomplished by means of cutting through said locking clip with a rotary saw.

* * * * *